(12) United States Patent
Macor

(10) Patent No.: US 10,240,923 B2
(45) Date of Patent: Mar. 26, 2019

(54) CARPENTER LEVEL

(71) Applicant: Richard J. Macor, Hunterdon County, NJ (US)

(72) Inventor: Richard J. Macor, Hunterdon County, NJ (US)

(73) Assignee: Proprietary Technologies, Inc.

( * ) Notice: Subject to any disclaimer, the term of this patent is extended or adjusted under 35 U.S.C. 154(b) by 143 days.

(21) Appl. No.: 15/731,465

(22) Filed: Jun. 13, 2017

(65) Prior Publication Data

US 2018/0356219 A1    Dec. 13, 2018

(51) Int. Cl.
*G01C 9/34* (2006.01)
*G01C 9/26* (2006.01)

(52) U.S. Cl.
CPC ..................... *G01C 9/26* (2013.01)

(58) Field of Classification Search
CPC ........................................... G01C 9/34
USPC .................................... 33/379, 381
See application file for complete search history.

(56) References Cited

U.S. PATENT DOCUMENTS

| | | | | | |
|---|---|---|---|---|---|
| 1,362,813 A | * | 12/1920 | Neidl | ........................ | G01C 9/26 33/350 |
| 1,362,814 A | * | 12/1920 | Neidl | ........................ | G01C 9/24 33/381 |
| 5,379,524 A | * | 1/1995 | Dawson | ........................ | B25F 1/00 33/333 |
| 6,041,510 A | * | 3/2000 | Huff | ........................ | G01B 3/02 33/374 |
| 2003/0145476 A1 | * | 8/2003 | Chen | ........................ | B43L 7/00 33/484 |
| 2009/0320303 A1 | * | 12/2009 | Sparrow | ........................ | G01C 9/24 33/348 |
| 2010/0095543 A1 | * | 4/2010 | Inthavong | ........................ | H02G 1/00 33/528 |
| 2012/0110864 A1 | * | 5/2012 | Murray | ........................ | G01C 9/02 33/301 |
| 2012/0246957 A1 | * | 10/2012 | Daniel | ........................ | A47G 1/205 33/645 |
| 2015/0300819 A1 | * | 10/2015 | Pelletier | ........................ | G01C 9/34 33/379 |

OTHER PUBLICATIONS

Stanley 143554 60CM Fat Max Magnetic Level https://www.amazon.com/Stanley-Fatmax-Beam-Magnetic-Level/dp/B004s446YK.

* cited by examiner

*Primary Examiner* — George B Bennett

(57) ABSTRACT

A carpenter level which comprises a body that is elongated in a predetermined direction and has a front, a back, an upper part with two terminal ends, a lower part with two terminal ends, and a middle part. The carpenter level also has at least one holder component that has at least one cavity formed to detachably hold at least one marking instrument such as a pen, pencil or scriber. The at least one cavity of the at least one holder component has a back and a front and a plurality of contacting positions to simultaneously contact and detachably hold the marking instrument.

20 Claims, 5 Drawing Sheets

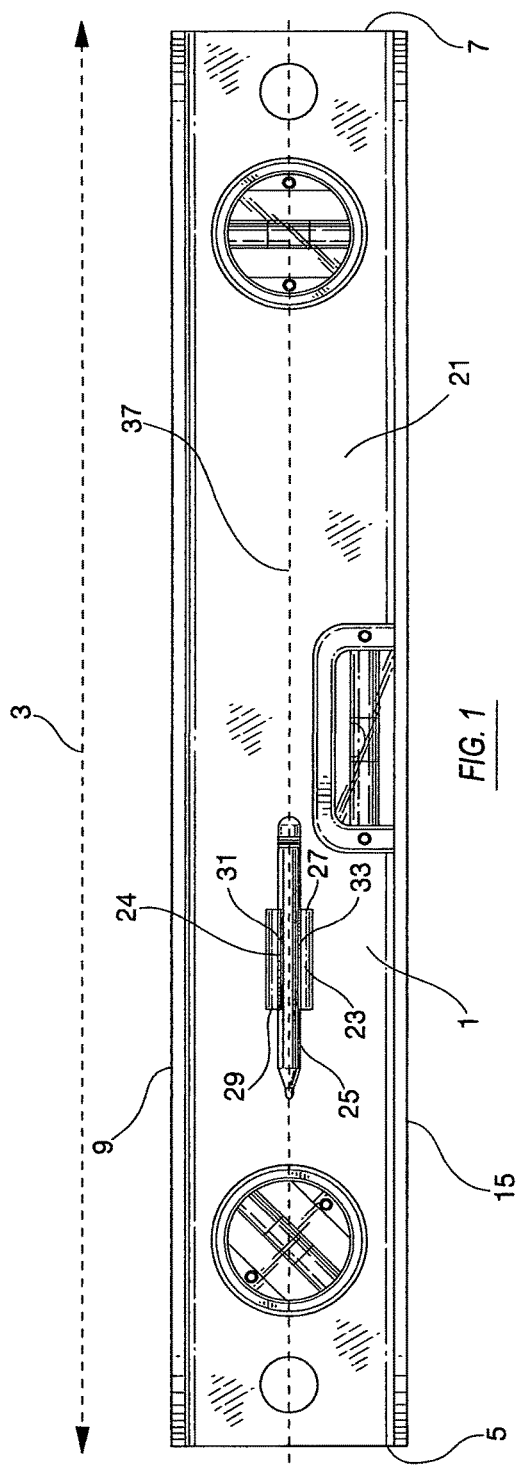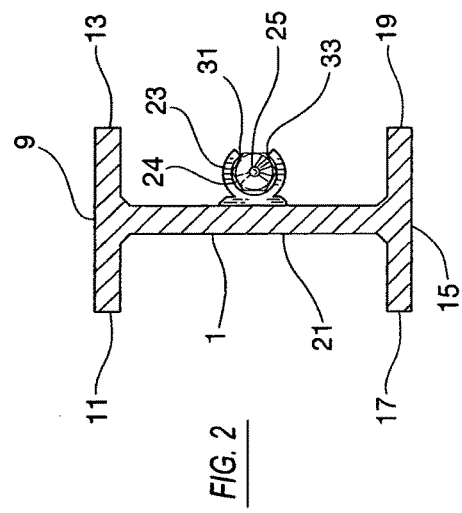

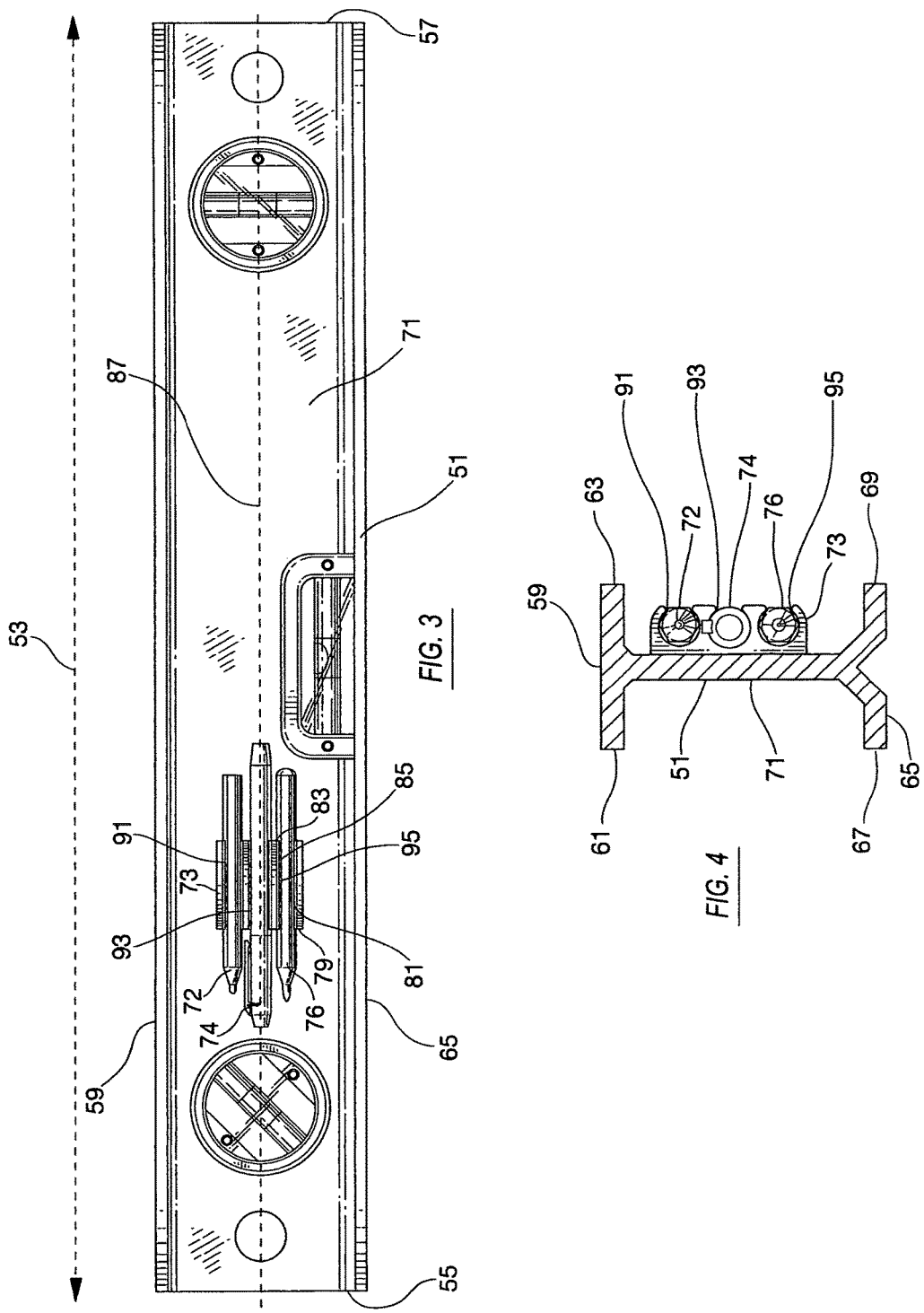

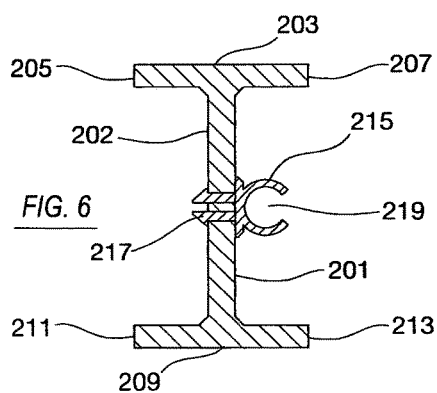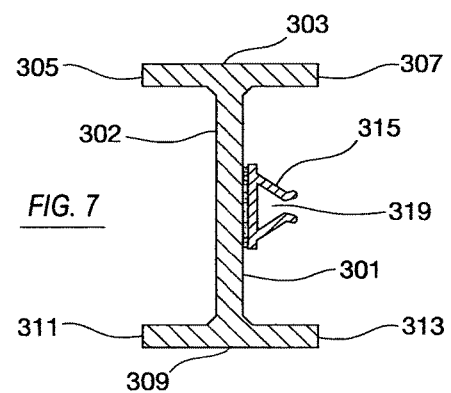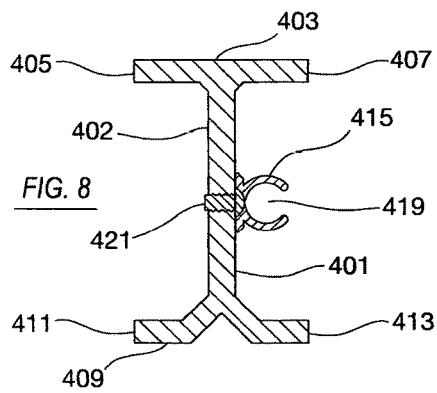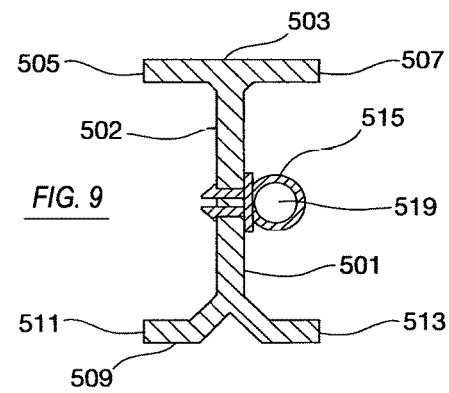

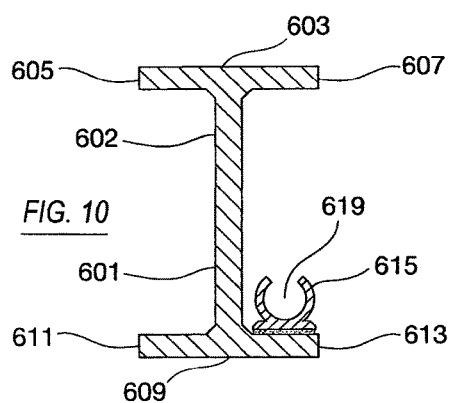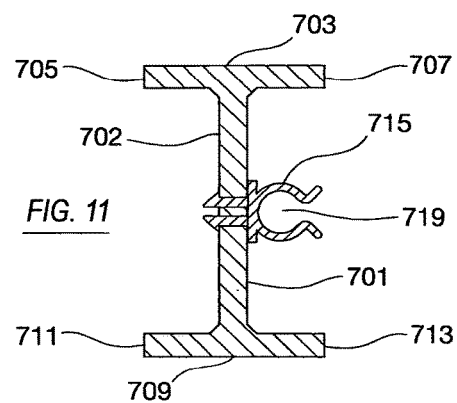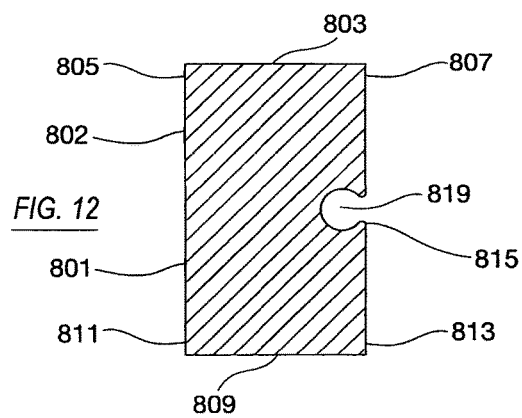

CARPENTER LEVEL

REFERENCES TO RELATED APPLICATIONS

This application relates to, and is a continuation-in-part of co-pending U.S. patent application Ser. No. 29/620,705 filed on May 1, 2017 entitled SECTION OF A CARPENTER LEVEL, also filed by the inventor herein.

FIELD OF THE INVENTION

The present invention relates to carpenter levels.

BACKGROUND OF THE INVENTION

Carpenter levels have been used by carpenters and builders for many years. A carpenter or builder will lay a carpenter level upon an object to determine what is level, horizontal, vertical etc. and then mark the object accordingly. However, marking the object requires that a marking instrument such as a pen or pencil is handy. The present invention ensures that a marking instrument such as a pen or pencil is always handy.

SUMMARY OF THE INVENTION

A carpenter level which comprises a body that is elongated in a predetermined direction and has a front, a back, an upper part with two terminal ends, a lower part with two terminal ends, and a middle part. The carpenter level also has at least one holder component that has at least one cavity formed to detachably hold at least one marking instrument such as a pen, pencil or scriber. The at least one cavity of the at least one holder component has a back and a front and a plurality of contacting positions to simultaneously contact and detachably hold the marking instrument.

It is an objective of the present invention described herein that it provides a carpenter, builder, or other user the convenience of having a marking instrument such as a pen or pencil always handy for use with the carpenter level.

It is another objective of the present invention that it can be created in a variety of different forms to provide a carpenter, builder, or other user the convenience of always having a marking instrument such as a pen or pencil handy when using a carpenter level.

It is another objective of the present invention that it be simple in design.

It is another objective of the present invention that it be durable under extended use.

It is another objective of the present invention that it be commercially viable and cost-efficient to manufacture.

BRIEF DESCRIPTION OF THE DRAWINGS

The present invention is more fully understood when the specification herein is taken in conjunction with the drawings appended hereto, wherein:

FIG. 1 shows a right side elevation view of one example embodiment of the present invention carpenter level;

FIG. 2 shows a front, cross-sectional elevation view of the present invention carpenter level shown in FIG. 1;

FIG. 3 shows a right side elevation view of another example embodiment of the present invention carpenter level;

FIG. 4 shows a front, cross-sectional elevation view of the present invention carpenter level shown in FIG. 3;

FIG. 6 shows a front, cross-sectional elevation view of an example embodiment of the present invention carpenter level;

FIG. 7 shows a front, cross-sectional elevation view of another example embodiment of the present invention carpenter level;

FIG. 8 shows a front, cross-sectional elevation view of another example embodiment of the present invention carpenter level;

FIG. 9 shows a front, cross-sectional elevation view of another example embodiment of the present invention carpenter level;

FIG. 10 shows a front, cross-sectional elevation view of another example embodiment of the present invention carpenter level;

FIG. 11 shows a front, cross-sectional elevation view of another example embodiment of the present invention carpenter level;

FIG. 12 shows a front, cross-sectional elevation view of another example embodiment of the present invention carpenter level.

DETAILED DESCRIPTION OF THE DRAWINGS

Figure 5:
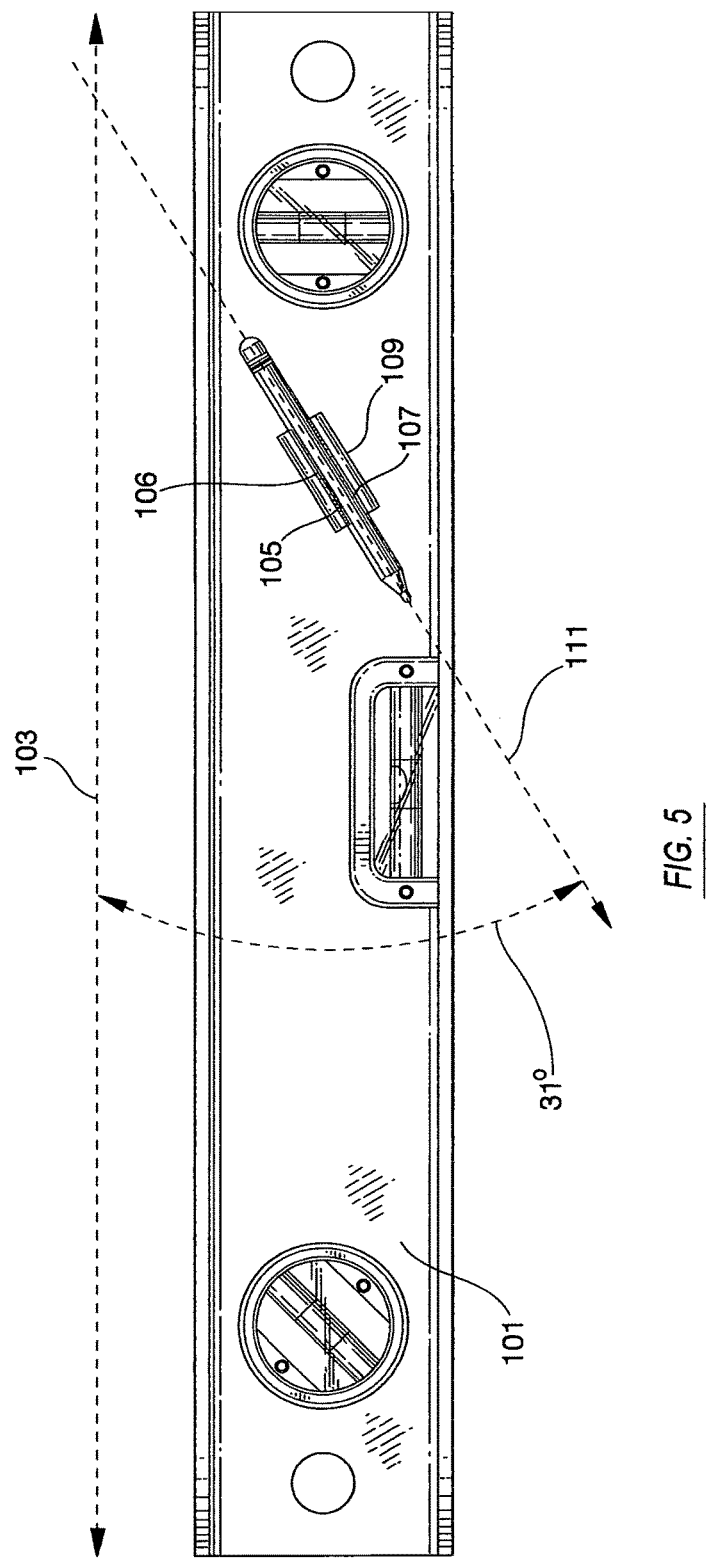
FIG. 5 shows a right side elevation view of another example embodiment of the present invention carpenter level.

The various drawings provided herein are for the purpose of illustrating examples of the present invention and not for the purpose of limiting same. Therefore, the drawings herein represent only a few of the many possible examples, embodiments, variations and/or applications of the present invention.

Referring now to FIGS. 1 and 2 together, FIG. 1 shows a right side elevation view of one example embodiment of the present invention carpenter level; and, FIG. 2 shows a front, cross-sectional elevation view of the present invention carpenter level shown in FIG. 1. In these Figures carpenter level 1 is elongated in a predetermined direction 3 with a cross-sectional shape formed generally in the shape of the letter "I" (seen best in FIG. 2). Carpenter level 1 has a front 5, a back 7, an upper part 9 with two terminal ends 11 and 13 (seen best in FIG. 2), a lower part 15 with two terminal ends 17 and 19 seen best in FIG. 2, and a middle part 21. Carpenter level 1 has a holder component 23 with a cavity 24 formed to detachably hold a marking instrument such as a pen or pencil 25. Holder component 23 has a back 27 and a front 29 and a plurality of contacting positions such as contacting positions 31 and 33 which simultaneously contact and detachably hold the marking instrument such as pencil 25. The plurality of contact positions such as contact positions 31 and 33 of cavity 24 create a focal point that is a straight central axis 37. In this embodiment of the present invention, the straight central axis 37 extends in a direction that is substantially parallel to the direction 3 at which carpenter level 1 is elongated as shown in this side view. In preferred embodiments of the present invention, each central axis of each cavity will extend in a direction that is parallel to or within 35 degrees of being parallel to, the direction at which the carpenter level is elongated when the carpenter level is viewed from a side view thereof. The present invention may comprise one holder component or multiple holder components each formed having at least one cavity to detachably hold at least one marking instrument. Each holder component can be mechanically and/or adhesively attached to the body of the level. Alternatively, each holder component can be integral with the body of the level wherein the holder component is molded, extruded, or formed (in any manner) into the body of the level. Preferably, the holder component 23 is attached to and/or formed into carpenter level 1 such that the holder component 23 does not protrude outside of either terminal end 11 or 13 of upper part 9; and, either terminal end 17 or 19 of lower part 15 so that the holder component and marking instrument(s) do not prevent the carpenter level from being laid flat against an object. This is seen best in an end-view such as the front (end-view) shown in FIG. 2.

Referring now to FIGS. 3 and 4 together, FIG. 3 shows a right side elevation view of another example embodiment of the present invention carpenter level; and, FIG. 4 shows a front, cross-sectional elevation view of the present invention carpenter level shown in FIG. 3. In these Figures carpenter level 51 is elongated in a predetermined direction 53 with a cross-sectional shape formed generally in the shape of the letter "I" (seen best in FIG. 4). Carpenter level 51 has a front 55, a back 57, an upper part 59 with two terminal ends 61 and 63 (seen best in FIG. 4), a lower part 65 with two terminal ends 67 and 69 seen best in FIG. 4, and a middle part 71. Carpenter level 51 has a holder component 73 with three cavities 91, 93, and 95 each formed to detachably hold a marking instrument such as a pen, pencil, scriber etc. For example, cavity 91 is detachably holding pencil 72; and, cavity 93 is detachably holding pen 74; and, cavity 95 is detachably holding scriber 76. Each cavity of holder component 73 has a back and a front. For example, cavity 95 has a back 83 and a front 79, and a plurality of contacting positions such as contacting positions 81 and 85 which simultaneously contact and detachably hold the marking instrument such as scriber 76 as shown. The plurality of contact positions such as contact positions 81 and 85 of cavity 95 create a focal point that is a straight central axis 87. In this embodiment of the present invention, the straight central axis 87 extends in a direction that is substantially parallel to the direction 53 at which carpenter level 51 is elongated as shown in this side view. In preferred embodiments of the present invention, each central axis of each cavity will extend in a direction that is parallel to or within 35 degrees of being parallel to, the direction at which the carpenter level is elongated when the carpenter level is viewed from a side view thereof. The present invention may comprise one holder component or multiple holder components each formed having at least one cavity to detachably hold at least one marking instrument. In this embodiment of the present invention, there is only one holder component that has three cavities. Each holder component can be mechanically and/or adhesively attached to the body of the level. Alternatively, each holder component can be integral with the body of the level wherein the holder component is molded, extruded, or formed (in any manner) into the body of the level. Preferably, the holder component 73 is connected to and/or formed into carpenter level 51 such that the holder component 73 does not protrude outside of either terminal end 61 or 63 of upper part 59; and, either terminal end 67 or 69 of lower part 65 so that the holder component and marking instrument(s) do not prevent the carpenter level from being laid flat against an object. This is seen best in an end-view such as the front (end-view) shown in FIG. 4.

FIG. 5 shows a right side elevation view of another example embodiment of the present invention carpenter level, wherein carpenter level 101 is elongated in a predetermined direction 103. In some preferred embodiments of the present invention, the at least one cavity of the at least one holder component has a plurality of contact positions that creates a focal point that is a straight imaginary central axis. For example, contact positions 105 and 107 of the at least one cavity 106, of the at least one holder component 109, create a focal point that is a straight imaginary central axis 111. In this embodiment of the present invention, the straight central axis 111 of cavity 106 diverges away from the direction 103 at which carpenter level 101 is elongated by about 31 degrees. In preferred embodiments of the present invention straight central axis 111 will extend in a direction that is parallel to or within 35 degrees of being parallel to, the direction 103 at which carpenter level 101 is elongated when the carpenter level is viewed from a side view thereof. Such orientation of each cavity provides sufficient space for the detachable attachment of standard length marking instruments such as pencils, pens, scribers etc.

FIG. 6 shows a front, cross-sectional elevation view of an example embodiment of the present invention carpenter level wherein carpenter level 201 has a middle part 202; an upper part 203 including terminal ends 205 and 207; and, a lower part 209 including terminal ends 211 and 213. Holder component 215 is mechanically attached to carpenter level 201 through a hole in the middle part 202 of carpenter level 201 as shown. Holder component 215 has a semi-flexible C-shaped cavity 219 as shown formed to detachably hold a marking instrument such as a pencil, pen or scriber (not shown.) Preferably, the holder component 215 is connected to and/or formed into carpenter level 201 such that the holder component 215 does not protrude outside of either terminal end 205 or 207 of upper part 203; and, either terminal end 211 or 213 of lower part 209 so that the holder component and marking instrument(s) (not shown) do not prevent carpenter level 201 from being laid flat against an object. This is seen best in an end-view such as the front (end-view) shown here in FIG. 6.

FIG. 7 shows a front, cross-sectional elevation view of another example embodiment of the present invention carpenter level wherein carpenter level 301 has a middle part 302; an upper part 303 including terminal ends 305 and 307; and, a lower part 309 including terminal ends 311 and 313. Holder component 315 is adhesively attached to carpenter level 301 as shown. Holder component 315 has a cavity 319 formed with multiple internal flat surfaces as shown to detachably hold a marking instrument such as a pencil, pen or scriber (not shown.)

FIG. 8 shows a front, cross-sectional elevation view of another example embodiment of the present invention carpenter level wherein carpenter level 401 has a middle part 402; an upper part 403 including terminal ends 405 and 407; and, a lower part 409 including terminal ends 411 and 413. Holder component 415 is mechanically attached to carpenter level 401 via screw 421 as shown. Holder component 415 has a semi-flexible C-shaped cavity 419 as shown formed to detachably hold a marking instrument such as a pencil, pen or scriber (not shown.) Preferably, the holder component 415 is connected to and/or formed into carpenter level 401 such that the holder component 415 does not protrude outside of either terminal end 405 or 407 of upper part 403; and, either terminal end 411 or 413 of lower part 409 so that the holder component and marking instrument(s) (not shown) do not prevent carpenter level 401 from being laid flat against an object. This is seen best in an end-view such as the front (end-view) shown here in FIG. 8.

FIG. 9 shows a front, cross-sectional elevation view of another example embodiment of the present invention carpenter level wherein carpenter level 501 has a middle part 502; an upper part 503 including terminal ends 505 and 507; and, a lower part 509 including terminal ends 511 and 513. Holder component 515 is mechanically attached to carpenter level 501 through a hole in the middle section 502 of carpenter level 501 as shown. Holder component 515 has a tubular shaped cavity 519 as shown which is formed to detachably hold a marking instrument such as a pencil, pen or scriber (not shown.)

FIG. 10 shows a front, cross-sectional elevation view of another example embodiment of the present invention carpenter level wherein carpenter level 601 has a middle part 602; an upper part 603 including terminal ends 605 and 607; and, a lower part 609 including terminal ends 611 and 613. Holder component 615 is adhesively attached to carpenter level 601 as shown to lower part 609. Holder component 615 has a semi-flexible C-shaped cavity 619 as shown which is formed to detachably hold a marking instrument such as a pencil, pen or scriber (not shown.) Preferably, the holder component 615 is connected to and/or formed into carpenter level 601 such that the holder component 615 does not protrude outside of either terminal end 605 or 607 of upper part 603; and, either terminal end 611 or 613 of lower part 609 so that the holder component and marking instrument(s) (not shown) do not prevent carpenter level 601 from being laid flat against an object. This is seen best in an end-view such as the front (end-view) shown here in FIG. 10.

FIG. 11 shows a front, cross-sectional elevation view of an example embodiment of the present invention carpenter level wherein carpenter level 701 has a middle part 702; an upper part 703 including terminal ends 705 and 707; and, a lower part 709 including terminal ends 711 and 713. Holder component 715 is mechanically attached to carpenter level 701 through a hole in the middle part 702 of carpenter level 701 as shown. Holder component 715 has a cavity 719 formed with multiple internal flat surfaces and multiple internal arc surfaces as shown to detachably hold a marking instrument such as a pencil, pen or scriber (not shown.)

FIG. 12 shows a front, cross-sectional elevation view of an example embodiment of the present invention carpenter level wherein carpenter level 801 has a middle part 802; an upper part 803 including terminal ends 805 and 807; and, a lower part 809 including terminal ends 811 and 813. Holder component 815 has a cavity 819 formed within the middle part 802 of carpenter level 801. Cavity 819 is C-shaped as shown and formed to detachably hold a marking instrument such as a pencil, pen or scriber (not shown.) In this embodiment of the present invention (and every embodiment of the present invention, the at least one holder component 815 is formed and connected to the carpenter level 801 whereby it does not protrude outside of either terminal end 805 or 807 of the upper part 803; and, either terminal end 811 or 813 of the lower part 809 so that the holder component and/or the marking instrument(s) do not prevent the level from being laid flat and flush against an object being measured. Each holder component can be mechanically and/or adhesively attached to the body of the level. Alternatively, each holder component can be integral with the body of the level wherein the holder component is molded, extruded, or formed (in any manner) into the body of the level such as in this embodiment of the present invention shown here in FIG. 12.

Upon reading and understanding the specification of the present invention described above, modifications and alterations will become apparent to those skilled in the art. It is intended that all such modifications and alterations be included insofar as they come within the scope of the patent as claimed or the equivalence thereof.

What is claimed is:

1. A carpenter level comprising:
   A body being elongated in a predetermined direction with a cross-sectional shape formed generally in the shape of the letter "I", said carpenter level having a front, a back, an upper part with two terminal ends, a lower part with two terminal ends, and a middle part;
   at least one holder component connected thereto having at least one cavity formed to detachably hold at least one marking instrument such as a pen or pencil, the at least one cavity of said at least one holder component having a back and a front and a plurality of contacting positions to simultaneously contact and detachably hold said marking instrument, and, said at least one holder component being formed and connected to said carpenter level whereby it does not protrude outside of either terminal end of said upper and lower parts when said carpenter level is viewed in a cross-sectional view where said at least one holder component is connected to said carpenter level.

2. The carpenter level of claim 1 wherein the at least one cavity of said at least one holder component is selected from the group consisting of: (i) a cavity having a plurality of internal flats; (ii) a cavity having a plurality of internal arcs; (iii) a cavity having a semi-flexible C-shaped section; (iv) a cavity having an internal tubular shape; and, a cavity having a combination of two or more of the groups.

3. The carpenter level of claim 1 wherein the plurality of contact positions of the at least one cavity creates a focal point that is a straight central axis, and, the straight central axis extends in a direction that is parallel to or within 35 degrees of being parallel to, the direction at which said carpenter level is elongated when said carpenter level is viewed from a side view thereof.

4. The carpenter level of claim 1 wherein the at least one holder component is mechanically attached to said carpenter level via at least one preformed hole in said carpenter level.

5. The carpenter level of claim 1 wherein the at least one holder component is adhesively attached to said carpenter level.

6. The carpenter level of claim 1 wherein the at least one holder component is connected to the middle part of said carpenter level.

7. The carpenter level of claim 2 wherein the plurality of contact positions of the at least one cavity creates a focal point that is a straight central axis, and, the straight central axis extends in a direction that is parallel to or within 35 degrees of being parallel to, the direction at which said carpenter level is elongated when said carpenter level is viewed from a side view thereof.

8. The carpenter level of claim 2 wherein the at least one holder component is mechanically attached to said carpenter level via at least one preformed hole in said carpenter level.

9. The carpenter level of claim 2 wherein the at least one holder component is adhesively attached to said carpenter level.

10. The carpenter level of claim 3 wherein the at least one holder component is mechanically attached to said carpenter level via at least one preformed hole in said carpenter level.

11. The carpenter level of claim 3 wherein the at least one holder component is adhesively attached to said carpenter level.

12. A carpenter level comprising:
    A body being elongated in a predetermined direction and having a front, a back, an upper part with two terminal ends, a lower part with two terminal ends, and a middle part;

at least one holder component having at least one cavity formed to detachably hold at least one marking instrument such as a pen or pencil, said at least one cavity having a back and a front and a plurality of contacting positions to simultaneously contact and detachably hold said marking instrument, and, said at least one holder component being formed and connected to said carpenter level whereby it does not protrude outside of either terminal end of said upper and lower parts when said carpenter level is viewed in a cross-sectional view where said at least one holder component is connected to said carpenter level.

13. The carpenter level of claim 12 wherein the at least one cavity of said at least one holder component is selected from the group consisting of: (i) a cavity having a plurality of internal flats; (ii) a cavity having a plurality of internal arcs; (iii) a cavity having a semi-flexible C-shaped section; (iv) a cavity having an internal tubular shape; and, a cavity having a combination of two or more of the groups.

14. The carpenter level of claim 12 wherein the plurality of contact positions of the at least one cavity creates a focal point that is a straight central axis, and, the straight central axis extends in a direction that is parallel to or within 35 degrees of being parallel to, the direction at which said carpenter level is elongated when said carpenter level is viewed from a side view thereof.

15. The carpenter level of claim 12 wherein the at least one cavity of said at least one holder component is formed within the body of said carpenter level.

16. The carpenter level of claim 13 wherein the plurality of contact positions of the at least one cavity creates a focal point that is a straight central axis, and, the straight central axis extends in a direction that is parallel to or within 35 degrees of being parallel to, the direction at which said carpenter level is elongated when said carpenter level is viewed from a side view thereof.

17. The carpenter level of claim 13 wherein the at least one cavity of said at least one holder component is formed within the body of said carpenter level.

18. The carpenter level of claim 15 wherein the at least one cavity of said at least one holder component is selected from the group consisting of: (i) a cavity having a plurality of internal flats; (ii) a cavity having a plurality of internal arcs; (iii) a cavity having a semi-flexible C-shaped section; (iv) a cavity having an internal tubular shape; and, a cavity having a combination of two or more of the groups.

19. The carpenter level of claim 15 wherein the plurality of contact positions of the at least one cavity creates a focal point that is a straight central axis, and, the straight central axis extends in a direction that is parallel to or within 35 degrees of being parallel to, the direction at which said carpenter level is elongated when said carpenter level is viewed from a side view thereof.

20. The carpenter level of claim 15 wherein the at least one cavity of said at least one holder component is formed within the middle part of the body of said carpenter level.

* * * * *